Oct. 22, 1963  G. E. WALKER  3,107,885
POWER OPERATED FLYING CONTROL SYSTEMS FOR AIRCRAFT
Filed July 31, 1961  2 Sheets-Sheet 1

INVENTOR
*GEORGE E. WALKER*

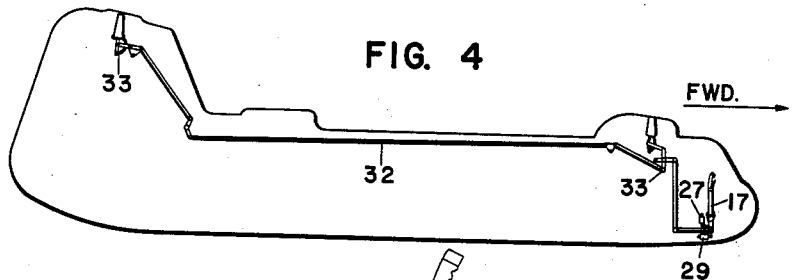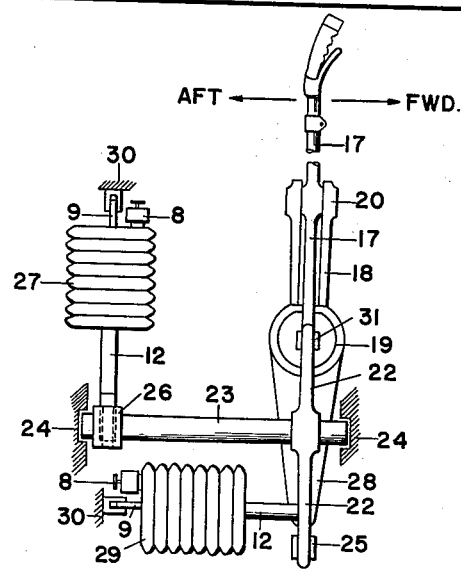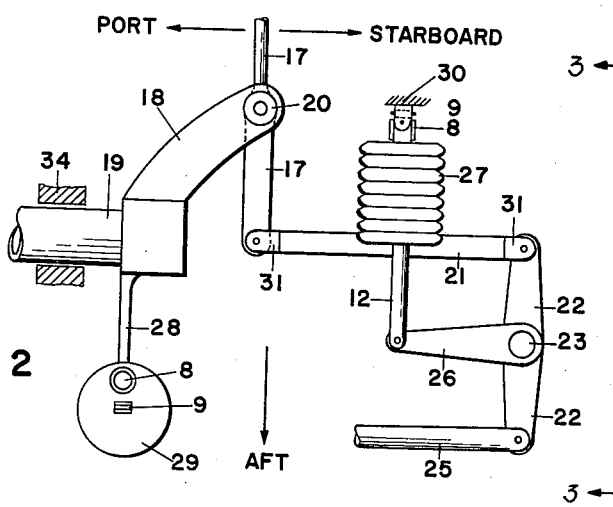

United States Patent Office 3,107,885
Patented Oct. 22, 1963

3,107,885
POWER OPERATED FLYING CONTROL SYSTEMS FOR AIRCRAFT
George E. Walker, Lympsham, Weston-Super-Mare, England, assignor to Westland Aircraft Limited, Yeovil, Somerset, England
Filed July 31, 1961, Ser. No. 128,153
Claims priority, application Great Britain Aug. 18, 1960
5 Claims. (Cl. 244—83)

This invention relates to power operated flying control systems for aircraft and more particularly for aircraft of the rotary wing type, where the actuation of the control surfaces is assisted or performed entirely by powered means under control of the pilot.

It is desirable in such systems to provide means which create at the pilot's control lever or column an artificial "feel" or resistance to movement simulating that which is experienced in the case of a manually operated control system without powered assistance; such artificial "feel" being proportional to the true aerodynamic loads on the control surfaces. It is also a feature of such control systems that they are self-centralising and unless some form of "automatic pilot" is used the control column must be held against the "feel" force when in any other than the centralised position.

These "feel" requirements in the helicopter field, have hitherto been met by simple mechanical means such as springs or elastic material, or by other complicated mechanical systems linked to the main powered control system and having no means to "set" the control in any desired position for what is termed by those skilled in the art as "hands off" flying.

The object of the present invention is to provide a simple device to act as a "feel" simulator for aircraft controls generally, but particularly for use with the cyclic pitch control in helicopters having power operated or power assisted control systems.

It is a further object of the invention to enable the pilot of a helicopter to "set" the "cyclic pitch" or main control lever, under certain flying conditions, in any desired position for "hands off" flight, thus reducing fatigue on the pilot or pilots.

It is a further object of the invention to provide the pilot with control "feel" which is in true proportion to the aerodynamic forces on the control surfaces regardless of altitude.

The invention consists in an artificial "feel" device for aircraft flying controls comprising a substantially airtight flexible bellows having rigid end plates disposed at the ends thereof, one of said end plates embodying an air valve having actuation means, each of said end plates carrying means for connection with a fixed point and a movable control means respectively, said device being adapted to be linked to an aircraft power control system and the pilot's control, so that movement of said pilot's control will result in compression or expansion of air within said bellows to produce a "feel" force, said "feel" force being in substantially true proportion to the aerodynamic loads on the control surfaces, said control surfaces being power actuated, said pilot's control capable of being "set" in other than the centralised position by virtue of balancing the pressure of the air within said bellows with that of ambient air by said valve means.

Further objects and advantages of the invention will become apparent from the following detailed description and drawings. Referring to the accompanying diagrammatic drawings:

FIGURE 2 shows the artificial "feel" device connected to the pilot's cyclic pitch control and associated linkage.

FIGURE 3 shows the artificial "feel" device connected to the pilot's cyclic pitch control as viewed on III—III.

FIGURE 4 shows diagrammatically the control linkage from the pilot's collective pitch control column to the pitch change mechanism and the relative positions of the "feel" devices.

Figure 1:
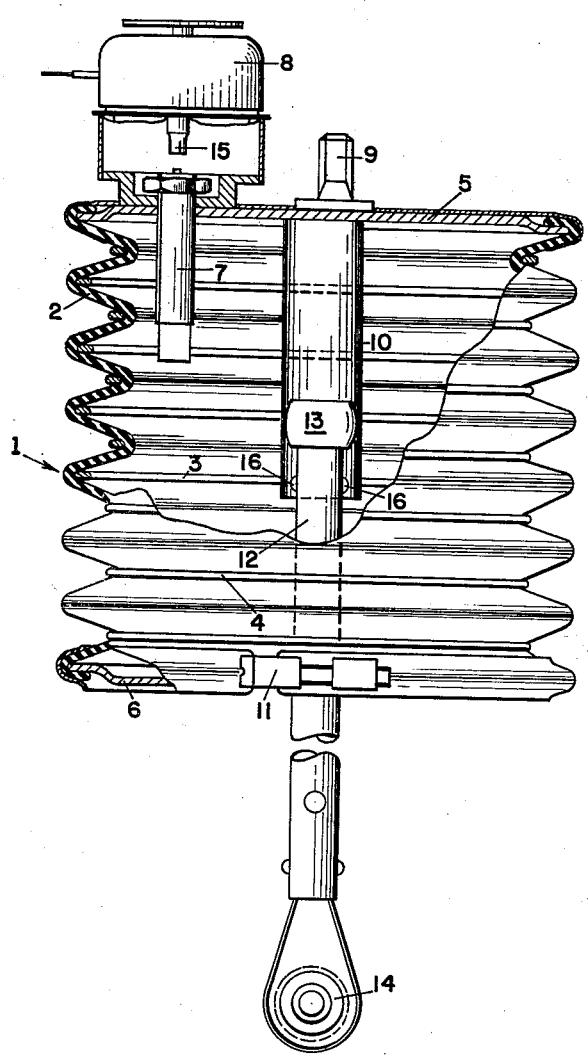
FIGURE 1 shows a part section of the artificial "feel" device with valve assembly.

In carrying the invention into effect according to one convenient form which is by way of example only, reference to FIGURE 1 shows the artificial "feel" device generally indicated at 1 comprising a bellows 2 made of rubber or any suitable flexible and substantially airtight material, the bellows 2 being strengthened by a series of inner stiffening rings 3 and outer stiffening rings 4 around the convolutions of said bellows 2 to prevent collapse. End plate assemblies 5 and 6 are clamped to each end of said bellows 2, the end plate 5 incorporating an external mounting for a Schrader type valve 7, operating solenoid 8 having a plunger 15, and connection 9 for static location of that end of the device 1. The inner face of the end plate 5 is fitted with a sleeve like member 10 extending internally approximately half the fully extended length of the bellows 2. The end plate 6 substantially seals the opposite end of the bellows 2 by virtue of the clamping means 11 compressing the flexible material of said bellows 2 around said end plate 6, in a similar manner to the clamp (not shown) on end plate 5. Passing through the centre of the end plate 6 and forming a fixed part of said end plate 6 is a piston 12, having a land 13 of slightly convex sectional form, said piston 12 passing inside the bellows 2 and into the sleeve like member 10 with what is termed by those skilled in the art as a "slide fit" within said sleeve member 10. This arrangement forms a stiffening means and a guide means which prevents any sag or obviates any misalignment of the bellows 2. The opposite end of the piston 12 is pivotally connected to an aircraft control rod by way of self aligning spherical bearing 14, and suitably positioned stops 16 limit the travel of the piston 12.

With reference to FIGURES 2 and 3 it will be seen that when installed in a helicopter to provide artificial "feel" for the pilot's cyclic pitch control, two such artificial "feel" devices 1, as hereinbefore described, are necessary.

The pilot's cyclic pitch control column 17 is pivotally connected through extending forked arms 18 on one end of the torque tube 19, such that when in the substantially vertical and centralised position, as indicated in FIGURES 2 and 3, the end of control column 17 is substantially in line with the centre line of said torque tube 19, but offset by the extension of said forked arms 18. The pivotal connection of said control column 17 between said forked arms 18 is made substantially at the open end of said forked arms 18 by pivot 20 which permits lateral movement of said control column 17 between said forked arms 18. Pivotally connected to the lower end of control column 17 is a lateral control link 21, having swivel ends 31, and extending horizontally to pivotally connect with the upper end of the now vertical control link lever 22. The control link lever 22 is keyed to a longitudinally extending shaft 23 at a point substantially midway between the ends of said lever 22. Pivotally connected to the lower end of said control link lever 22 is a power control link 25 connecting the pilot's control column 17 with a power control unit (not shown). The shaft 23 has its ends located in fixed bearings 24 but at the end remote from control link lever 22 and substantially at right angles to it is keyed lateral bellows lever 26 having its other end pivotally connected to piston 12 of lateral artificial "feel"

unit 27. The artificial "feel" unit 27 being virtually identical to that generally indicated at 1 of FIGURE 1 is adapted to suit the installation, and has one end pivotally attached by static connection 9, to a fixed point 30. Exending from the end of torque tube 19, diametrically opposite forked arms 18, is a fore and aft bellows lever 28 forming an integral part of said tube 19 and being pivotally connected to the fore and aft "feel" unit 29 by way of spherical bearing 14 on the end of piston 12. Fore and aft "feel" unit 29 is virtually identical to lateral "feel" unit 27. Torque tube 19 is also operatively connected to the power control system. Fore and aft "feel" unit 29 has its static connection 9 pivotally connected to fixed point 30.

FIGURE 4 merely shows the relative installed positions of the pilot's cyclic control column 17, the artificial "feel" units 27 and 29, and the various rods and levers generally indicated at 32, leading to the pitch change mechanism 33. These control mechanisms having no direct bearing on the invention and it is sufficient to appreciate that they are operated by initial movement of the control column 17 with suitable power augmentation, and are linked with the artificial "feel" units 27 and 29 so that any movement of the control column in any desired direction affects either or both said "feel" units.

In operation of the invention it will now be clearly understood from FIGURES 1, 2 and 3 that when the pilot's control column 17, which is also electrically connected to solenoid 8 by any suitable switch mechanism (not shown), is for example moved to port, it will rotate about pivot 20 and the lower end of the column 17, which is pivotally connected to lateral control link 21 will move to starboard. In consequence, control link lever 22 will move clockwise, and being keyed to shaft 23 it will move the lateral bellows lever 26, which is keyed to the opposite end of said shaft 23, in a clockwise direction also. Since lever 26 is pivotally connected to piston 12, said piston 12 will be moved toward fixed point 30 together with its integral end plate 6 thus compressing the air within the lateral "feel" unit 27. The air within the bellows of the lateral "feel" unit 27, is air at the pressure of the surrounding atmosphere and will hereinafter be referred to as ambient air. This air has entered the bellows in the first instance by way of Schrader valve 7 being lifted off its seat by plunger 15 when solenoid 8 was energised by a switch on the control column 17. The ambient air now offers resistance to movement or "feel" at the pilot's control column and the further the control column 17 is moved to port the greater the compression of the air and the greater the resisance or "feel." It will also be appreciated that since power control link 25 is operatively connected to control link lever 22 any movement of that lever will be relayed to the power control mechanism and the control surfaces themselves, in this instance, the cyclic pitch of the rotor blades will change to the required setting under power supplied. Should the pilot move the control column 17 in the opposite direction, that is to say to starboard, all the movements hereinbefore described will be reversed and lateral "feel" unit 27 will now be expanded. Since any such expansion of the bellows 2 of unit 27 can only take place against the vacuum force created by this movement, said bellows 2 being substantially airtight, resistance or "feel" will again be felt by the pilot, related to the amount of control movement. These pressure or vacuum forces will also cause the control column 17 to centralise should the pilot let go. Referring again to FIGURES 2 and 3, if the pilot moves the control column 17 in the forward direction, torque tube 19 will rotate in bearing 34, but by virtue of the swivel ends 31 lateral control link 21 will remain at rest and no torque will be applied. At the same time fore and aft bellows lever 28 will move aft thus compressing the bellows 2 of fore and aft "feel" unit 29 against ambient air within said bellows 2. Conversely, should the pilot move the control column 17 in the aft direction, expansion against a vacuum force will result.

Under certain conditions of flight the pilot may wish to "trim" the aircraft in one particular attitude and release his hold on the control column. This is achieved by moving the control column 17 to any desired position and then by pressing a switch (not shown) on said control column 17, he will energise solenoid 8 to operate plunger 15 which pushes Schrader valve 7 off it's seating. Instantly, air will escape from a bellows in the compressed state or enter a bellows in the semi-vacuum state. On de-energising the solenoid 8 in the new desired position, ambient air will again be sealed within the bellows 2 as the Schrader valve 7 returns to its seat and the control will be automatically "set." Any tendency for the control to centralise will again be met by "compression" or "vacuum" resistance. Thus the 'feel" force is instantly reinstated for the 'trimmed" position and will also be correct according to the altitude of the aircraft, representing a true proportion of the real aerodynamic forces on the control surfaces which in this instance will be the rotor blades of the helicopter.

It will also be seen from FIGURES 2 and 3 that the pilot can make many and varied combinations of movement of the control column 17, involving both lateral and fore and aft controls together and therefore both artificial 'feel" units 27 and 29, without in any way affecting the principle of operation. For the sake of clarity only the aforesaid detailed description dealt with the fore and aft or port and starboard movements of the control column 17.

It will also be understood by those skilled in the art that many variations of installation are possible without any major alteration to the artificial "feel" device 1. For example in one modified form there is no reason why the static connection should not be made at the end of piston 12 at the spherical bearing 14, and the control connection at 9, and it is also obvious that the solenoid 8 and Schrader valve 7 may also be attached to the opposite end plate 6 if so desired. Neither is the artificial "feel" device 1 limited to helicopters and would serve equally well to "trim" any conventional flying controls on fixed wing aircraft provided they are power operated or power assisted so that no severe aerodynamic loads are imposed directly on the pilot's control column or rudder bar.

Without in any way departing from the scope of the invention the "feel" device could also find application on any ship or vehicle having power operated controls, where a simple "feel" device is essential to the skilled manoeuvring of said ship or vehicle.

I claim as my invention:

1. In an aircraft and especially an aircraft of the rotary wing type an artificial "feel" device in combination with power operated flying controls, comprising, a substantially airtight flexible bellows provided with rigid end plates, one end plate provided with a centrally disposed rigidly attached piston adapted to engage a centrally disposed cylinder attached to the inner face of the opposite end plate, attachment means on the protruding end of said piston for indirect connection to flying control surfaces by way of power operated control means and a pilot's control lever, attachment means on the opposite end plate for connection to a static point within the aircraft, and connections being reversible without affecting the operation of said device, one of said end plates being provided with an air valve remotely operated by the pilot in such a manner that when said air valve is closed any movement from the centralised position of the pilot's control lever will cause compression of ambient air within said bellows in one direction or expansion in the opposite direction to a degree related to the amount of pilot's control movement, thereby providing a variable "feel" force proportional to the aerodynamic loads on the control surfaces being actuated, said pilot's control lever being capable of being "set" from the centralised position by momentarily opening said air valve and equalising the air pressure within said bellows with that of said ambient air.

2. An artificial "feel" device as claimed in claim 1, wherein one or more of such devices may be used to provide "feel" on a control column when moved in more than one plane or combinations of movement in more than one plane simultaneously.

3. An artificial "feel" device of the type specified comprising a substantially airtight flexible bellows having rigid sealing means disposed at each end thereof, one of said sealing means carrying at least means for connection to a fixed point and the other sealing means carrying at least a movable control means for connection to control surfaces, an air valve carried by one of said sealing means and having associated therewith valve actuation means, the arrangement being such that when said air valve is closed any movement of said movable control means will cause compression of air within said bellows in one direction or expansion in the opposite direction related to the amount of control movement, thereby providing a variable "feel" force proportional to the loads on the control surfaces.

4. An artificial "feel" device of the type specified comprising a substantially airtight flexible bellows having rigid sealing means disposed at each end thereof, one of said sealing means carrying at least means for connection to a fixed point and the other sealing means carrying at least a movable control means for connection to control surfaces, an air valve carried by one of said sealing means and having associated therewith valve actuation means comprising a plunger adapted to be actuated by remote control means to open said air valve, the arrangement being such that when said air valve is opened momentarily by said remote control means, the air pressure within said bellows and the pressure of the ambient air are equalized, permitting said movable control means to be then "set" in any desired position, whence the air valve is closed by release of said remote control means, any further movement of said movable control means causing compression of air within said bellows in one direction or expansion in the opposite direction related to the amount of control movement, thereby providing a variable "feel" force proportional to the loads on the control surfaces.

5. An artificial "feel" device as claimed in claim 4, wherein said remote control means comprise a solenoid to control said plunger actuated by an electrical switch.

References Cited in the file of this patent

UNITED STATES PATENTS

| | | |
|---|---|---|
| 2,091,300 | Bassett et al. | Aug. 31, 1937 |
| 2,333,401 | Woods | Nov. 2, 1943 |